(12) United States Patent  
Clark

(10) Patent No.: US 8,328,604 B2
(45) Date of Patent: Dec. 11, 2012

(54) VACUUM SAW

(75) Inventor: Duane Lee Clark, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 728 days.

(21) Appl. No.: 12/448,450

(22) PCT Filed: Dec. 21, 2007

(86) PCT No.: PCT/US2007/026159
§ 371 (c)(1),
(2), (4) Date: Oct. 12, 2009

(87) PCT Pub. No.: WO2008/079332
PCT Pub. Date: Jul. 3, 2008

(65) Prior Publication Data
US 2010/0022175 A1    Jan. 28, 2010

Related U.S. Application Data

(60) Provisional application No. 60/876,823, filed on Dec. 21, 2006.

(51) Int. Cl.
*A22C 25/16* (2006.01)
(52) U.S. Cl. .................................... 452/160
(58) Field of Classification Search ............. 452/149, 452/150, 152, 153, 154, 160–163, 166, 170, 452/177, 180, 182, 183
See application file for complete search history.

(56) References Cited

U.S. PATENT DOCUMENTS

| 3,939,749 | A |   | 2/1976 | Muller et al. |
| 4,201,256 | A |   | 5/1980 | Truhan |
| 4,202,076 | A | * | 5/1980 | Rancatore ........................ 452/8 |
| 4,706,335 | A | * | 11/1987 | Schram et al. ................ 452/163 |
| 4,842,478 | A |   | 6/1989 | Durr et al. |
| 4,974,290 | A |   | 12/1990 | Cloninger |
| 5,199,922 | A |   | 4/1993 | Korenberg et al. |
| 5,503,594 | A | * | 4/1996 | Karubian et al. ............. 452/173 |
| 5,779,533 | A | * | 7/1998 | Jacobs et al. .................. 452/160 |
| 6,050,889 | A |   | 4/2000 | Jacobs et al. |
| 6,968,764 | B2 |   | 11/2005 | Gorun et al. |
| 7,179,163 | B1 | * | 2/2007 | Vedsted et al. ................ 452/121 |
| 7,261,630 | B2 | * | 8/2007 | Krogh ............................ 452/160 |
| 7,427,229 | B2 | * | 9/2008 | Grosseholz et al. .......... 452/106 |
| 7,559,830 | B2 | * | 7/2009 | Solberg et al. ................ 452/121 |
| 8,092,283 | B2 | * | 1/2012 | Hansen ........................ 452/121 |
| 2003/0192816 | A1 |   | 10/2003 | Opfel |

FOREIGN PATENT DOCUMENTS

| DE | 203 00 140 | 3/2003 |
| EP | 1 625 908 | 2/2006 |
| GB | 1 219 724 | 1/1971 |
| WO | WO 03/086084 | 10/2003 |

* cited by examiner

*Primary Examiner* — Richard Price, Jr.

(57) ABSTRACT

A carcass processing system is provided. The carcass processing system includes housing, a splitting arrangement for splitting a carcass, elongate members attached to the housing for loosening unpalatable materials from the carcass, and vacuum suction ports coupled to the housing for collecting the loosened unpalatable materials.

22 Claims, 5 Drawing Sheets

VACUUM SAW

CROSS REFERENCE TO RELATED APPLICATION

This application claims the benefit of U.S. Provisional Patent Application having Ser. No. 60/876,823, filed on Dec. 21, 2006, titled VACUUM SAW, and PCT application Serial No. US07/26159 filed Dec. 21, 2007 entitled VACUUM SAW, which are hereby incorporated by reference in their entirety.

FIELD OF THE INVENTION

The present invention generally relates to the slaughter industry. More particularly, the present invention relates to a carcass processing system.

BACKGROUND

Carcass processing systems in the slaughter industry typically include tools for splitting animal carcasses. In addition, tools to remove unpalatable materials, such as, spinal cord, spinal cord skin, and the like, from the carcass are often included in these systems. Further, during the splitting operation, waste materials, such as, bone dust, debris from the split carcass and water, are produced. Hence, tools for removal of the waste materials are useful to prevent contamination of the carcass being split and of succeeding carcasses.

Traditionally, separate tools are employed for each of the various processes such as splitting the animal carcass, loosening the unpalatable materials, and removing the waste materials produced. A lot of time and effort is required for carrying out these processes separately. Hence, there exists a need for a carcass processing system which can carry out each of the above-mentioned processes in a fast, easy, reliable and efficient manner.

SUMMARY

An embodiment of the present invention is directed to provide a carcass processing system. The carcass processing system includes a housing substantially enclosing a splitting arrangement for splitting a carcass, one or more elongate members attached to the housing, the elongate members for loosening unpalatable materials from the carcass, one or more vacuum suction ports in the housing, the vacuum suction ports for collecting the loosened unpalatable materials, and a vacuum hose to remove the unpalatable materials.

Another embodiment of the present invention is directed to provide a carcass processing system. The carcass processing system includes a housing substantially enclosing a splitting arrangement, one or more elongate members attached to the housing which may be used for loosening unpalatable materials, one or more vacuum suction ports in the housing which may be used for collecting the loosened unpalatable materials, a vacuum hose to remove the unpalatable materials, a cyclone separator connected to the vacuum hose, and a blower connected to the cyclone separator, where the blower vacuums away a gas from the cyclone separator.

BRIEF DESCRIPTION OF DRAWINGS

The present invention is illustrated, by way of example, and not limitation, in the figures of the accompanying drawings in which.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The embodiments of the present invention provide a carcass processing system for simultaneously splitting a carcass and removing unpalatable material from therein. Further, in an embodiment of the present invention, the carcass processing system is capable of removing waste material generated while splitting the carcass. In various embodiments of the present invention, the carcass processing system includes a carcass splitting arrangement to split a carcass. Once a portion of the carcass is split, one or more elongate members loosen the unpalatable material from the split portions of the carcass. In an embodiment of the present invention, the loosened unpalatable material and the waste material generated while splitting the carcass are collected by one or more vacuum suction ports. The collected material is then removed via a vacuum hose.

Figure 1:
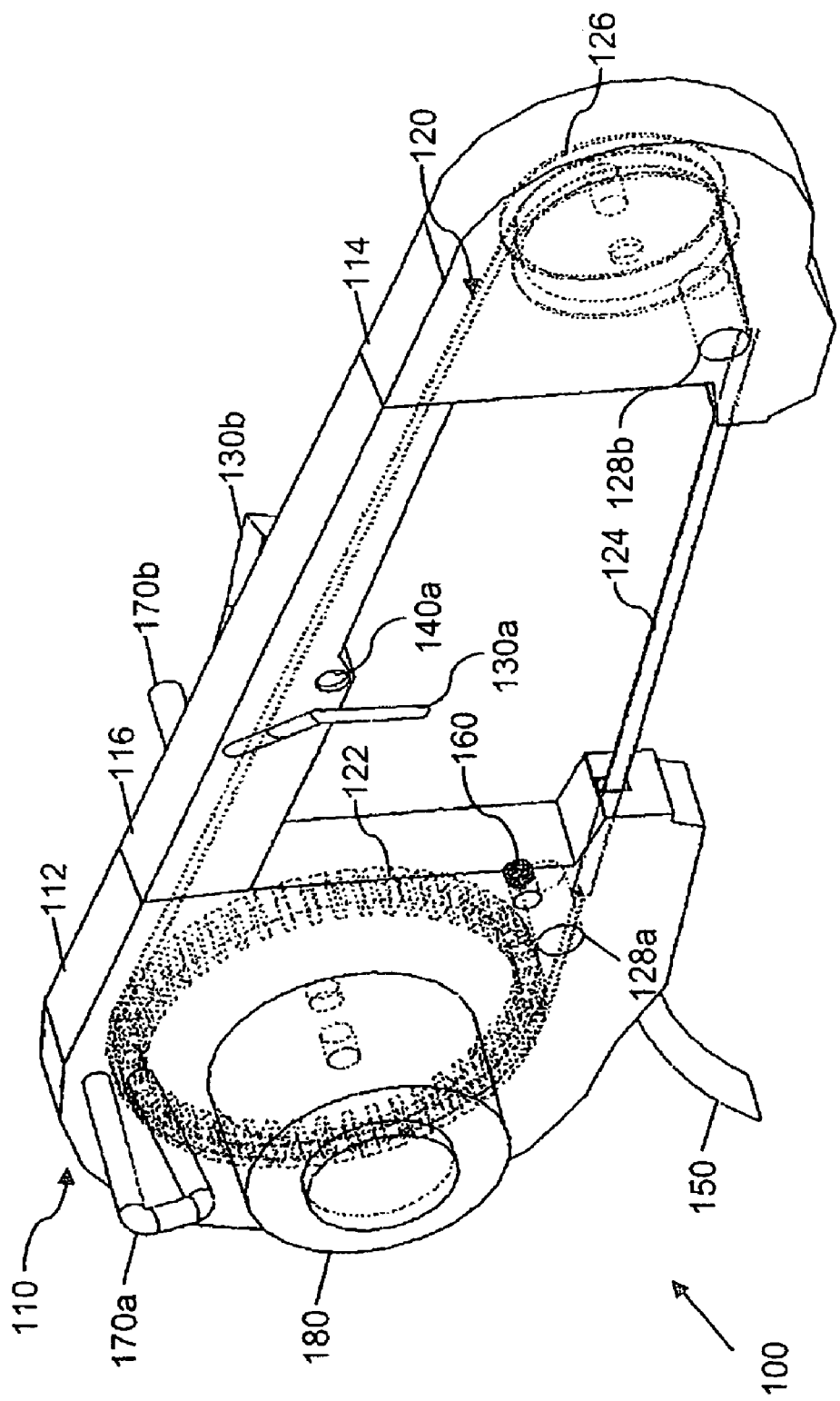
FIG. 1 illustrates a perspective view of a carcass processing system, in accordance with an embodiment of the present invention.

FIG. 1 illustrates a view of a carcass processing system 100, in accordance with an embodiment of the present invention. Carcass processing system 100 includes a housing 110, a splitting arrangement 120, elongate members 130a and 130b, vacuum suction ports 140a and 140b (140b is not visible in FIG. 1 as 140b is located on the other side of system 100), a vacuum hose 150, sprinklers 160, handles 170a and 170b, and a motor 180.

In an embodiment of the present invention, the housing 110 includes a first cover 112, a second cover 114, and a rail 116 connecting the first cover 112 to the second cover 114. In various embodiment of the present invention, the rail 116 is fixed to the first cover 112 and the second cover 114, using fasteners, such as, nuts and bolts, rivets, welds, and the like. In an embodiment of the present invention, the first cover 112 and the second cover 114 include doors with hinges and latches. The doors can be opened to expose the splitting arrangement 120 enclosed in the housing 110, for maintenance, lubrication, assembly and other similar tasks.

Housing 110 supports the splitting arrangement 120. In an embodiment of the present invention, the splitting arrangement 120 includes a driving wheel 122, a saw blade 124, a supporting wheel 126, and guide blocks 128a, 128b. Driving wheel 122 is rotatably coupled to the first cover 112 by an axle (not depicted), the axle being supported by the first cover 112 by bearing means such as ball bearing, roller bearing, journal bearing, bushing, and the like. In addition, the axle is coupled to the driving wheel 122, such that the driving wheel 122 rotates with the axle. In an embodiment of the present invention, the axle is splined, and correspondingly, the hub of driving wheel 122 is splined. In another embodiment of the present invention, the axle and driving wheel 122 are coupled together by means of a key and keyway arrangement. Further, the axle is driven by the motor 180. In an embodiment of the present invention, the motor 180 may be an electrical motor, or a pneumatic motor. Electricity or compressed air may be provided through an external tube (not shown in FIG. 1), depending on whether the motor 180 is electric or pneumatic. An arrangement, similar to the arrangement used for coupling the driving wheel 122 to the first cover 112 can be used to couple the supporting wheel 126 to the second cover 114. Both the driving wheel 122 and the supporting wheel 126 support and carry the saw blade 124.

In an embodiment of the present invention, saw blade 124 is guided optionally by the guide blocks 128a, 128b. Guide blocks 128a, 128b keep saw blade 124 aligned to a carcass, while splitting the carcass. In an embodiment of the present invention, the guide blocks 128a, 128b are capable of rotating about an axis parallel to the axis of rotation of the axle. Further, the saw blade 124 passes through slots in the first and second covers 112, 114. In various embodiments of the present invention, the slots orient the saw blade 124 so that a cutting edge of the saw blade 124 comes in contact with the carcass, while splitting the carcass. In an embodiment of the present invention, where the saw blade 124 is a continuous loop band saw, the saw blade 124 goes through 90 degree twists close to the slots. In another embodiment of the present invention, saw blade 124 is a chain saw blade.

While various embodiments of the present invention have been illustrated using a splitting arrangement with a continuous loop-band saw, driving wheels, etc., it would be apparent to one skilled in the art that the teachings of the present invention may be employed for any carcass processing system that is capable of splitting a carcass. Hence, in various embodiments of the present invention, splitting arrangement 120 can be, without limitation, a reciprocating saw arrangement, a circular saw arrangement or a brisket saw arrangement.

Elongate members 130a, 130b are attached to the housing 110 for loosening unpalatable materials from a portion of the carcass split by the splitting arrangement 120. In operation, as the saw blade 124 cuts through a portion of the carcass, waste materials such as dust bone, loose debris from the carcass, and the like, are generated. A portion of the carcass splits to expose the unpalatable materials such as the spinal cord, the skin covering the spinal cord, etc. The end of the elongate members 130a, 130b not attached to the housing 110, herein after referred to as the free end, comes in contact with the unpalatable material in order to loosen the unpalatable material. Vacuum suction ports 140 are provided to collect the loosened unpalatable material. The collected unpalatable material is removed via vacuum hose 150 coupled to the housing 110.

Figure 2:
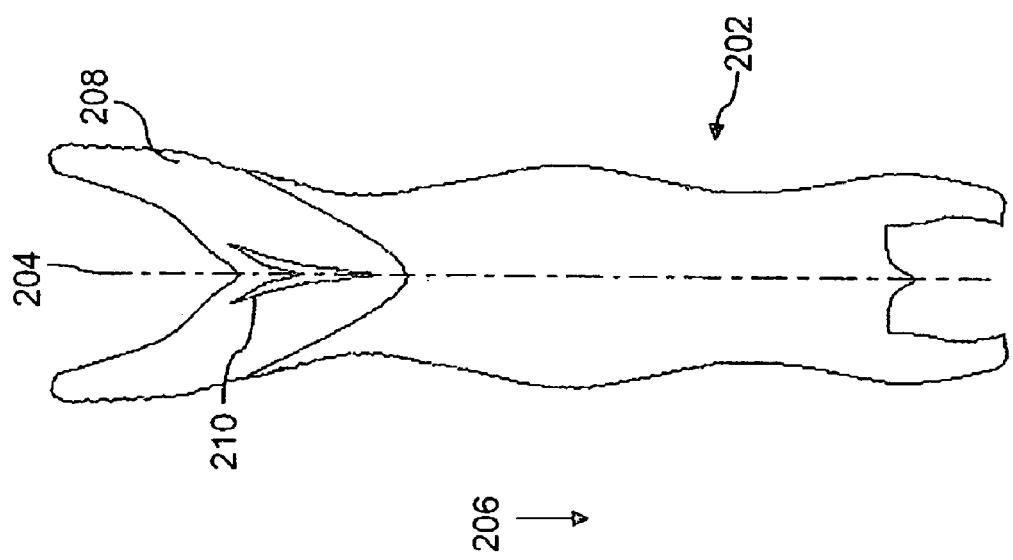
FIG. 2 illustrates the splitting of a carcass in accordance with an embodiment of the present invention.

The splitting of carcass has been illustrated in conjunction with FIG. 2. FIG. 2 illustrates the splitting of a carcass 202, in accordance with an embodiment of the present invention. The carcass 202 is hung vertically along an axis 204. The carcass 202 is split along the axis 204 by the saw blade 124 (shown in FIG. 1) in a direction 206. In operation, as the saw blade 124 cuts through a portion 208 of the carcass, preferably dividing it into two separate halves. During the cutting operation the saw blade cuts through the skin, muscle and bones including the spinal cord, ribs, ligaments, cartilage and the like. The portion 208 of the carcass hence splits to expose unpalatable materials 210, such as, the spinal cord, the skin covering the spinal cord, and the like. Thereafter, the free ends of elongate members 130a, 130b come in contact with the unpalatable material 210 in the two halves of the portion 208 in order to loosen the unpalatable material 210 and scrap it from the portion 208 (not depicted). It would be known to a person skilled in the art that a scrapping action followed by vacuuming would result in cleaning the portion 208 of the unpalatable material.

While various embodiments of the present invention have been illustrated using two elongate members coupled to the housing, it would be apparent to one skilled in the art that the teachings of the present invention may be employed for carcass processing systems with a single elongate member. In an embodiment of the present invention, the single elongate member may be two pronged. In another embodiment of the present invention, the single elongate member is wide enough to scrap off the unpalatable material from the split portions of a carcass. Hence, in various embodiments of the present invention, without limitation, there may be one or more elongate members coupled to the housing.

Figure 3:
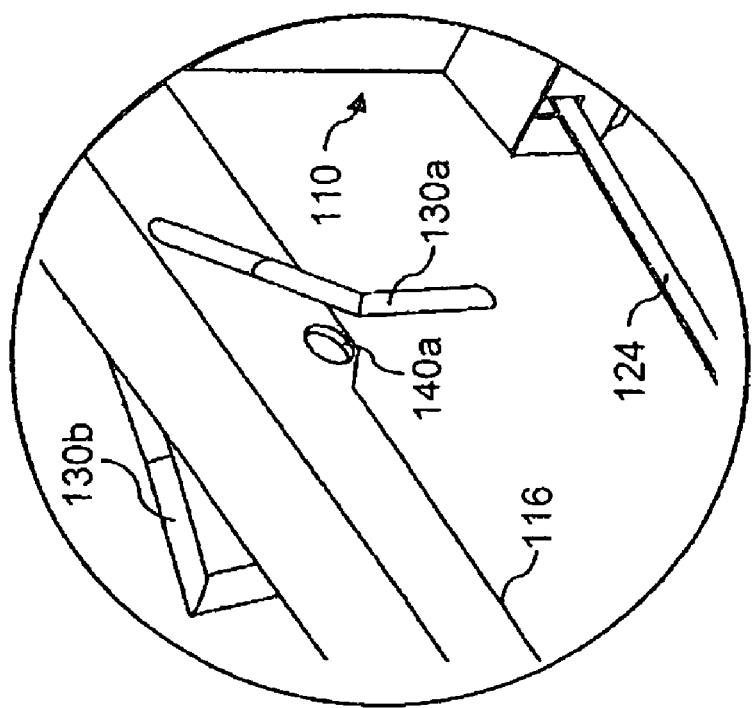
FIG. 3 illustrates the positioning of the elongate member(s), the saw blade(s), and the vacuum port(s), in accordance with an embodiment of the present invention.

FIG. 3 illustrates the positioning of the saw blade 124, the elongate members 130a, 130b and vacuum suction ports 140, in accordance with an embodiment of the present invention. As shown in FIG. 3, the end of the elongate members 130a, 130b not attached to the housing 110 are positioned above the saw blade 124, so that the portion of carcass is split before the end of elongate members 130a, 130b not attached to the housing 110, comes into contact with the unpalatable material in the split portion of the carcass. In an embodiment of the present invention, the end of the each of the elongate members 130a, 130b not attached to the housing 110 includes one or more knife edges. In another embodiment of the present invention, the end of each of the elongate members 130a, 130b not attached to the housing 110 includes hook-like structures, not depicted herein, which hook the unpalatable material and shear off from the carcass. In various embodiments of the present invention, elongate members 130 may include scooping edges, scrappers, rub bars, peelers, claws, forked ends, striking members, and the like to loosen the unpalatable material from the carcass.

In various non-limiting embodiments of the present invention, elongate members 130 are attached to housing 110 using fasteners, such as, screws, nuts and bolts, welds, glue, and the like. In an embodiment of the present invention, elongate members 130 include resilient members to provide for flexibility. The resilient member can be a corrugated segment, a coil, a spring, a member made of resilient material such as rubber, silicone rubber, acrylic polymers, or similar material. In addition, in various embodiments of the present invention, the resilient member can be coupled at the free end of elongate members 130, at the end of elongate members 130 coupled to housing 110, herein after referred to as fixed end, and at a location between the free end and the fixed end of elongate members 130.

In an embodiment of the present invention, elongate members 130 have a uniform cross section such as a circular cross-section, a polygonal cross-section, an oval cross-section, a splined cross-section, etc. In another embodiment, elongate members 130 have a non-uniform cross-section. In various embodiments of the present invention, elongate members 130 are L-shaped, Y-shaped, V-shaped, fork shaped, and the like.

In an embodiment of the present invention, vacuum suction ports 140 are provided below the free end of elongate members 130 and are coupled to housing 110. In an embodiment of the present invention, vacuum suction ports 140 are coupled to rail 116. In addition, vacuum suction ports 140 are sized to receive the unpalatable material. The size of the vacuum suction ports 140 can be determined by the size of the animal carcass being slaughtered. The size of the vacuum suction ports may be greater than the maximum size of spinal material to be removed during the splitting operation. In another embodiment of the present invention, vacuum suction ports 140 are integral to housing 110. In yet another embodiment of the present invention, elongate members 130 are hollow and vacuum suction ports 140 are located at the free end of elongate members 130. In an embodiment of the present invention, vacuum suction ports 140 can be placed in the wall of rail 116 that is parallel to the cutting edge of saw blade 124, as shown in FIG. 3. In another embodiment of the present invention, vacuum suction ports 140 can be placed in the housing 110 perpendicular to the cutting edge of saw blade 124.

In an embodiment of the present invention, vacuum suction ports 140 are coupled to housing 110 by connecting tubes. In an embodiment of the present invention, the tubes are flexible so that the vacuum suction ports 140 can be located at a position defined by an operator. In another embodiment of the present invention, the tubes are fixed to housing 110.

In various embodiments of the present invention, vacuum suction ports 140 are coupled to vacuum hose 150 by passageways, ducts, tubes, and the like. Further, in one embodiment of the present invention, the passageways, ducts, tubes, and the like may be placed inside housing 110. In one embodiment of the present invention, the passageways, ducts, tubes, and the like may be placed outside housing 110.

In an embodiment of the present invention, the vacuum suction ports 140 may collect the waste material generated while splitting the carcass. In another embodiment, the guide blocks 128a, 128b wipe saw blade 124 of the waste material and the material is removed via vacuum hose 150 connected to vacuum suction ports 140. In various embodiments of the present invention, sprinklers 160 are provided to clean the waste material from the saw blade 124. In an embodiment of the present invention, sprinklers 160 sprinkle water to clean the waste material from saw blade 124. The waste material, along with the water and the unpalatable material, is then removed via the vacuum hose. In another embodiment of the present invention, the sprinklers 160 blow air at high speed to clean the waste material from the saw blade 124.

In an embodiment of the present invention, the sprinklers 160 can be 180 degree water sprays. Sprinklers 160 receive water from a pipe line (not depicted). In another embodiment of the present invention, the sprinklers 160 are placed inside the housing 110 above the saw blade 124. In various embodiments of the present invention, the sprinklers 160 sprinkle water to flush out waste material that accumulate inside the crevices of housing 110.

In an embodiment of the present invention, the handles 170a, 170b are used by an operator to manipulate carcass processing system 100 along the carcass while splitting the carcass and bringing the free end of elongate members 130 into contact with the unpalatable material. In an embodiment of the present invention, handles 170a, 170b are in the form of circular protrusion(s) perpendicular to housing 110. A grip may be provided on the circular protrusions. In another embodiment of the present invention, handles 170a, 170b can be in the form of depressions in housing 110. In yet another embodiment of the present invention, handles 170 can be in the form of a lofted segment of housing 110. In still another embodiment of the present invention, handles 170a, 170b are foldable. In various embodiments of the present invention, handles 170a, 170b are fixed to the housing 110 using fasteners, such as screws, nuts and bolts, welds, threaded pin-hole arrangements, or the like.

Various additional elements such as the on/off switch, counterbalancing systems, electrical controls, lubrication system, systems for mounting/dismounting saw blade, system for safety of operator, etc. are well known to a person skilled in the art, and hence, need not be described or depicted herein.

In an embodiment of the present invention, the components of the carcass processing system 100 are made of light materials such as alloys of aluminum, thermosetting plastics, and the like, unless otherwise specified. For example, the saw blade 124 may be made of titanium alloys, stainless steel, or other long lasting materials. Further, the cutting edge of the saw blade 124 may include heat treated segments. In addition, the components coming in continuous contact with the saw blade 124 may be made of materials with same or greater hardness as the saw blade 124.

In an embodiment of the present invention, elongate members 130 are coupled to rail 116, as shown in FIG. 3. In another embodiment of the present invention, elongate members 130 are coupled to first cover 112. Vacuum suction ports 140 collect the unpalatable material loosened by elongate members 130. As shown in FIG. 3, elongate members 130 are positioned such that the free end of elongate members is above saw blade 124, so that the portion of carcass is split before the free end of elongate members 130 come into contact with the unpalatable material in the split portion of the carcass. In an embodiment of the present invention, the free end of elongate members 130 come into contact with the unpalatable material due to the natural action during carcass splitting operation. In another embodiment of the present invention, the free end of elongate members 130 are manipulated to come into contact with the unpalatable material by the operator during carcass splitting operation. In one embodiments of the present invention, the knife edges at the free end of elongate members 130 come in contact with the unpalatable material and separate the unpalatable material from the carcass by cutting off the carcass portions holding the unpalatable material with the carcass. In another embodiment of the present invention, the hook-like structures at the free end of elongate members 130 entangle with the unpalatable material and shear the unpalatable material from the carcass during the carcass splitting operation. In yet another embodiment of the present invention the peelers at the free end of elongate members 130 peel off the unpalatable material off the carcass.

In an embodiment of the present invention, vacuum suction ports 140 are positioned below the free end of elongate members 130, so that the loosened unpalatable material falling under the action of gravity is collected by vacuum suction ports 140. In another embodiment of the present invention, vacuum suction ports 140 are symmetrically placed about saw blade 124. In another embodiment of the present invention, vacuum suction ports 140 are in the form of a single port located below the free end of elongate members 130. In yet another embodiment of the present invention, vacuum suction ports 140 are connected by a flexible tube to housing 110 and the flexible tube can be manipulated by the operator to place vacuum suction ports 140 in a desired position.

In another embodiment of the present invention, the free ends of elongate members 130 are located at predefined horizontal distances from the saw blade. The predefined horizontal distances are determined by the size of the animal carcass. In an embodiment of the present invention, the predefined horizontal distances can be 2-20 centimeters. In another embodiment of the present invention, elongate members 130 are located to make predefined angles with the vertical and horizontal plane of housing 110 so that they are oriented to come into contact with the unpalatable material in the split portion of the carcass. Further, in various embodiments of the present invention, elongate members 130 are flexible.

Figure 4:
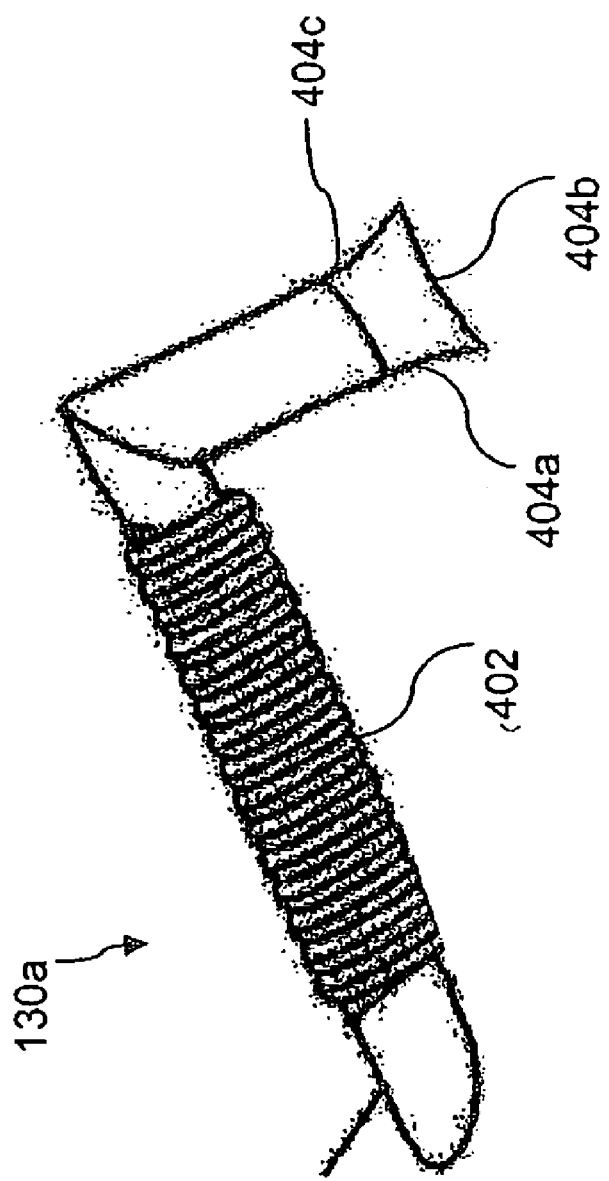
FIG. 4 illustrates a detailed view of an elongate member, in accordance with an embodiment of the present invention.

FIG. 4 illustrates a detailed view of the elongate member 130a. Although, the illustration and the description below is with regard to the elongate member 130a, similar illustration and description may be applicable for the elongate member 130b. As shown in FIG. 4, the elongate member 130a is shaped like an L and with a circular cross section. The elongate member 130a includes a flexible segment 402. The flexible segment 402 allows the elongate member 130a to move along directions perpendicular to the cutting edge of saw blade 124. The flexible segment 402 allows elongate member 130a to adjust to animal carcasses of various sizes for example, a cow's carcass, a horse's carcass, a sheep's carcass, and the like during the cutting operation. Additionally, the elongate member 130a may include knife edges 404a, 404b, and 404c. The knife edges 404a, 404b, 404c cut through carcass portions substantially close to the unpalatable material, consequently loosening the unpalatable material.

Figure 5:
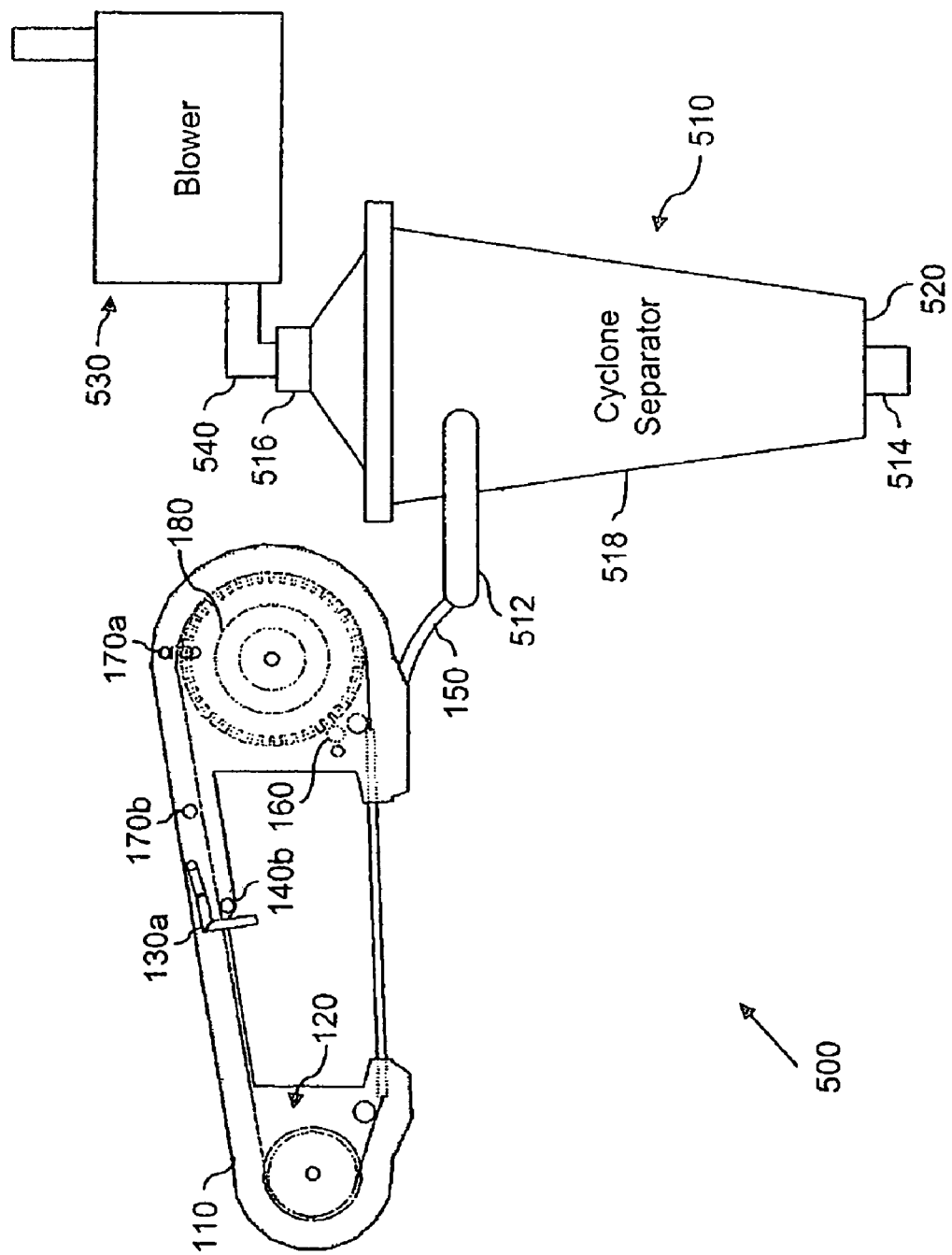
FIG. 5 illustrates a layout of carcass processing system, in accordance with another embodiment of the present invention.

FIG. 5 illustrates a layout of a carcass processing system 500, in accordance with another embodiment of the present invention. Carcass processing system 500 includes housing 110, splitting arrangement 120, elongate members 130a and 130b, vacuum suction ports 140a and 140b, vacuum hose 150, sprinklers 160, handles 170a and 170b, motor 180, a cyclone separator 510, a blower 530, and a connecting hose 540.

Various embodiment of the present invention, including housing 110, splitting arrangement 120, elongate members 130a, 130b, vacuum suction ports 140a, 140b, vacuum hose 150, sprinklers 160, handles 170a, 170b, and motor 180 have been described in conjunction with FIG. 1. Cyclone separator 510 is connected to vacuum hose 150 to receive the unpalatable material collected by vacuum suction ports 140. The cyclone separator 510 may optionally also receive the waste material generated while splitting the carcass and the water from sprinklers 160 via the vacuum hose 150. Blower 530 is coupled by connecting hose 540 to cyclone separator 510. Blower 530 vacuums away a gas from cyclone separator 510 via connecting hose 540.

Cyclone separator 510 includes a receiving port 512, a first output port 514, a second output port 516, a conical body 518, and a bottom 520. In an embodiment of the present invention, receiving port 512 and second output port 516 are located in the upper half of conical body 518. In another embodiment of the present invention, the first output port 514 is located at bottom 520 of cyclone separator 510.

In an embodiment of the present invention, blower 530 vacuums away the gas from cyclone separator 510 via second output port 516. Due to this a suction effect is created in cyclone separator 510. Further, the suction effect is transferred via vacuum hose 150 to vacuum suction ports 140 where the unpalatable material is collected due to the suction effect. Hence, the gas along with the material is removed via vacuum hose 150 such that the unpalatable material and waste material generated while splitting the carcass and the water from sprinklers 160, is drawn into conical body 518 at receiving port 512. In an embodiment of the present invention, receiving port 512 is positioned so that the air along with the removed material enters tangentially to conical body 518. Thereafter, the air along with the removed material follows a spiral path down the conical body 518. Due to higher inertia than the gas and a centrifugal force, the removed material sticks to the inner wall of conical body 518 of cyclone separator 510. Further, in an embodiment of the present invention, the stuck material precipitates to bottom 520 of cyclone separator 510 under the action of gravity. The precipitated material is then collected at first output port 514. In an embodiment of the present invention, the precipitated material collected at first output port 514 is disposed via a conveyer belt (not depicted). In another embodiment of the present invention an air lock is provided at first output port 514. In addition, the gas substantially free from the removed material moves in an upward direction at the center of the conical body 518 and is thereafter vacuumed out by blower 530 via second output port 516.

In various embodiment of the present invention, the gas can be dehydrated air, atmospheric air, inert gases, air containing disinfectants, and the like.

In various embodiments of the present invention, additional elements such as air filters, dehumidifiers, flow regulators, knife gates, etc. may be provided with cyclone separator 510. However, those elements are well known to any person ordinarily skilled in the art, and hence need not be described here.

Blower 530 is connected via connecting the hose 540 to the cyclone separator 510. In an embodiment of the present invention, blower 530 is a KICE™ Blower commercially available from Kice Industries of Wichita, Kans., USA, although other blowers may alternatively be employed. Further, such other blowers are well known to persons of ordinary skill in the art, and therefore need not be described here in detail.

Various embodiments of the present invention provide carcass processing systems which simultaneously split the carcass and remove unpalatable material from the carcass, making carcass processing more efficient and economical. Further, in an embodiment of the present invention, the unpalatable material and the waste material generated while splitting the carcass are also removed simultaneously to prevent the contamination of succeeding carcasses.

While a particular embodiment has been shown and described, it will be apparent to those skilled in the art that variations and modifications may be made therein without departing from the true scope and spirit of the invention. It is the purpose of the appended claims to cover all such variations and modifications. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

I claim:

1. A carcass processing system comprising:
   a) a housing substantially enclosing a splitting arrangement for splitting a carcass;
   b) one or more elongate members attached to the housing, the elongate members used for loosening unpalatable materials from the carcass; and
   c) one or more vacuum suction ports for collecting the loosened unpalatable materials.

2. The carcass processing system of claim 1, wherein the splitting arrangement comprises:
   d) a driving wheel powered by an electric motor;
   e) a saw blade for splitting the carcass, wherein the blade is actuated by the driving wheel; and
   f) a supporting wheel for supporting the saw blade when splitting the carcass.

3. The carcass processing system of claim 2, wherein the splitting arrangement further comprises one or more guide blocks to orient the saw blade for splitting the carcass.

4. The carcass processing system of claim 2, wherein the housing for enclosing the splitting arrangement comprises:
   g) a first cover to cover the driving wheel, wherein the driving wheel is rotatably supported on the first cover;
   h) a second cover to cover the supporting wheel, wherein the supporting wheel is rotatably supported on the second cover; and
   i) a rail connecting the first cover to the second cover.

5. The carcass processing system of claim 4, wherein the one or more elongate members are attached to the first cover.

6. The carcass processing system of claim 4, wherein the one or more elongate members are attached to the rail.

7. The carcass processing system of claim 1, wherein the one or more elongate members are attached to the housing retractably.

8. The carcass processing system of claim 1, wherein the one or more elongate members are flexible.

9. The carcass processing system of claim 1, wherein the one or more elongate members have a circular cross-section.

10. The carcass processing system of claim 1, wherein the one or more elongate members are L-shaped.

11. The carcass processing system of claim 1, wherein the one or more elongate members comprises one or more knife-edges at the end of each of the one or more elongate members not attached to the housing.

12. The carcass processing system of claim 1, wherein the one or more elongate members are oriented at predefined angles from the vertical plane and the horizontal plane of the housing.

13. The carcass processing system of claim 1, wherein the one or more elongate members comprise at least one of a peeler, a scraper, a rub bar, a hook, a claw, and a striking member.

14. The carcass processing system of claim 1, further comprising one or more water sprinklers located inside the housing to clean the saw blade of waste material generated while splitting the carcass.

15. The carcass processing system of claim 1, further comprising a vacuum hose connected to the one or more vacuum suction ports to remove the unpalatable material.

16. The carcass processing system of claim 1, further comprising one or more handles attached to the housing.

17. The carcass processing system of claim 16, further comprising one or more 180 degree water sprinklers located inside the housing.

18. The carcass processing system of claim 16, wherein the gas is air.

19. The carcass processing system of claim 1, wherein the one or more vacuum suction ports coupled to the housing.

20. The carcass processing system of claim 19, wherein the waste material is removed via the vacuum hose to the cyclone separator.

21. The carcass processing system of claim 19, wherein the cyclone separator comprises:
   a) a receiving port connected to the vacuum hose, the first receiving port receiving the removed material from the vacuum hose;
   b) a first output port for precipitating the removed material received at the first receiving port; and
   c) a second output port connected to the blower, wherein the blower vacuums out a gas from the second output port those results in a suction force at the one or more vacuum suction ports.

22. A carcass processing system, the system comprising:
   a) a housing substantially enclosing a splitting arrangement;
   b) one or more elongate members attached to the housing;
   c) one or more vacuum suction ports;
   d) a vacuum hose connected to the one or more vacuum suction ports;
   e) a cyclone separator connected to the vacuum hose; and
   f) a blower coupled to the cyclone separator.

\* \* \* \* \*